A. MARKMANN & W. STAUTER.
SPRING DEVICE FOR STARTING AUTOMOBILES.
APPLICATION FILED DEC. 1, 1911.

1,031,134.

Patented July 2, 1912.

2 SHEETS—SHEET 2.

UNITED STATES PATENT OFFICE.

ALEXANDER MARKMANN AND WILLY STAUTER, OF DUSSELDORF, GERMANY, ASSIGNORS TO CARL MARKMANN, OF DUSSELDORF, GERMANY.

SPRING DEVICE FOR STARTING AUTOMOBILES.

1,031,134.  Specification of Letters Patent.  Patented July 2, 1912.

Application filed December 1, 1911. Serial No. 663,337.

*To all whom it may concern:*

Be it known that we, ALEXANDER MARKMANN and WILLY STAUTER, both citizens of the Empire of Germany, residing at Dusseldorf, in the Empire of Germany, have invented a new and useful Spring Device for Starting Automobiles, of which the following is a specification.

Our invention relates to improvements in spring devices for starting automobiles.

The chief feature of the improvement consists in a spring-pressed gear wheel, which is mounted on a pin parallel to the shaft driving the rear wheel axle by means of worm gearing, permanently meshes with a long pinion fastened on a second shaft parallel to the first shaft and can be shifted at will into engagement with a pinion on the first shaft for winding up a helical spring surrounding the second shaft and connected at one end with the frame and at the other end with the long pinion. The gear wheel has on one side a rim provided with a recess and a lug close thereto. A cross shaft mounted to rock in the frame carries a handle and a curved arm, which is adapted to strike the lug and to press against the rim on the gear wheel for simultaneously braking the motor and shifting the gear wheel into engagement with the pinion on the first shaft, until the curved arm faces the recess in the rim, whereupon the gear wheel by its spring is automatically pushed back into its initial position. For starting the motor the handle requires to be moved back for releasing the gear wheel, whereupon the strained helical spring will turn back the second shaft, which by means of a suitable transmission turns the motor for starting the automobile.

We will now proceed to describe our invention with reference to the accompanying drawing, in which—

Figure 1:
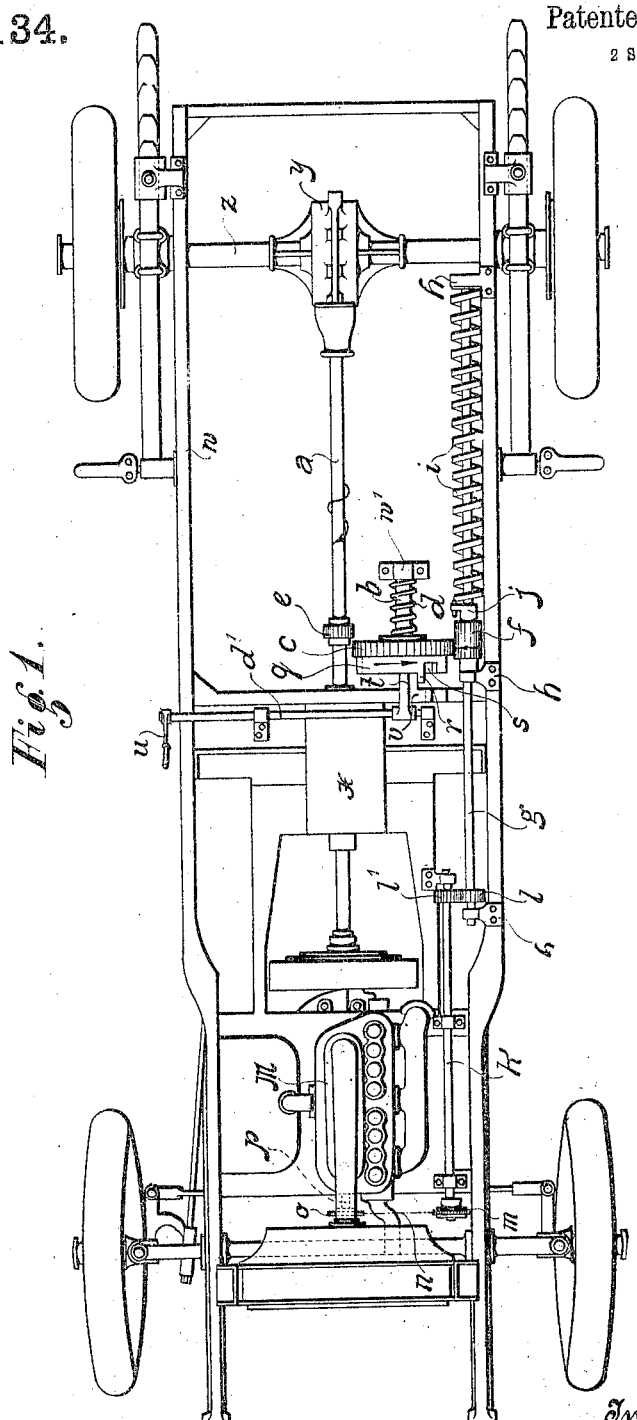
Figure 2:
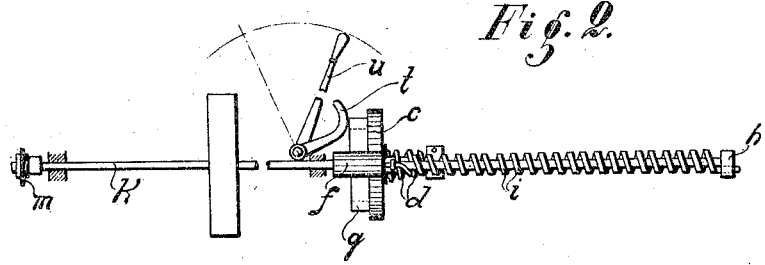
Figure 3:
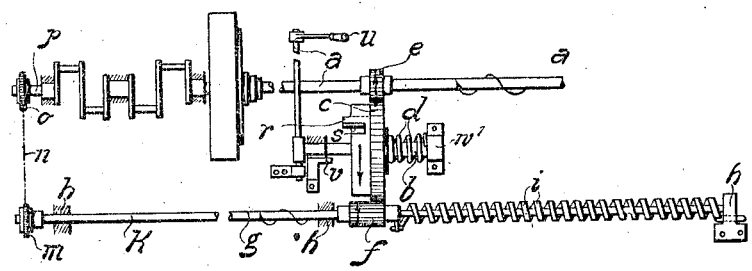
Figure 4:
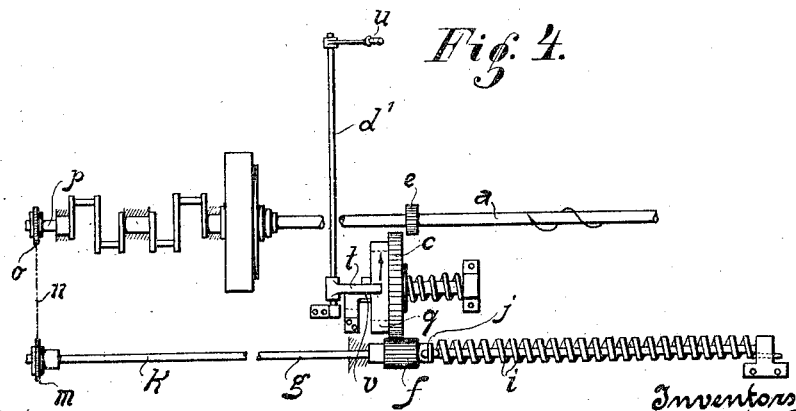

Figure 1 is a plan view of an automobile provided with the new spring device, which occupies its normal position, Fig. 2 is an elevation of the spring device alone, the gear wheel being pushed into engagement with the pinion on the first shaft, Fig. 3 is a plan view of the same, and Fig. 4 is a similar view, in which the gear wheel in its normal position is locked.

Similar letters of reference refer to similar parts throughout the several views.

$a$ is a shaft which is driven from the motor M by means of the shaft $p$ and any approved gearing contained in the box $x$ and is adapted to drive the rear wheel axle $z$ by means of any known worm gearing contained in the casing $y$. The shaft $a$ has fastened on it a pinion $e$.

A pin or shaft $b$ parallel to the shaft $a$ is mounted in the frame $w$ and carries a gear wheel $c$, which is loose on it and can be longitudinally moved. A helical spring $d$ surrounding the pin $b$ and inserted between the gear wheel $c$ and some part $w^1$ of the frame $w$ tends to press the gear wheel forward into its normal position shown in Fig. 1. A cross shaft $d^1$ mounted in the frame $w$ to rock has fastened on it a handle $u$ and a curved arm $t$, which can be best seen in Fig. 2. The gear wheel $c$ has on its front side a rim $q$, which serves as a brake and is provided with a recess $s$ and a lug $r$ close thereto. A stop $v$ is fastened on the frame $w$ and is adapted to come in contact with the lug $r$. Normally the handle $u$ occupies a left position marked by a single line in Fig. 2, so that the radial portion of the curved arm $t$ leans on the edge of the rim $q$. In the normal position shown at Fig. 1 the gear wheel $c$ does not mesh with the pinion $e$, on the shaft $a$, which is assumed to turn in the direction of the spiral arrow. When, however, the handle $u$ is moved rearward into the other position shown in full lines in Fig. 2, the curved arm $t$ will push the gear wheel $c$ by means of the rim $q$ rearward into engagement with the pinion $e$, as is shown at Fig. 3.

A long shaft $g$ parallel to the shaft $a$ is mounted in suitable bearings $h$ $h$ on the frame $w$ to turn and has fastened on it a long pinion $f$, with which the gear wheel $c$ permanently meshes, no matter whether it occupies one or the other extreme position on the pin $b$. A long helical spring $i$ surrounds the shaft $g$ between the pinion $f$ and the rear bearing $h$. Preferably the rear end of the spring $i$ is so bent as to engage beneath the rear bearing $h$ (see Fig. 4), and in a similar manner the front end of the spring is so bent as to engage an arm $j$ fastened on the shaft g or connected with the long pinion f. The front end of the shaft g carries a gear wheel l, which meshes with another one l¹ on a shaft k parallel to the motor shaft p and mounted to turn in the frame w. The front end of the shaft k carries a chain wheel m, which is connected by means of an endless chain n with another chain wheel o on the motor shaft p. Preferably a clutch (not shown) of any approved construction is put near the gear wheel l on the shaft g or near the gear wheel l¹ or the chain wheel m on the shaft k or near the chain wheel o on the motor shaft p, so as to connect at will the motor shaft p with the long pinion f. We do not show nor describe this clutch and the mechanism for operating it, as it forms no part of our invention.

The spring device described operates as follows: Normally during the drive of the automobile the gear wheel c occupies the position shown at Fig. 1, in which the lug r of its rim q is in contact with the stop v. Of course the helical spring i is preferably so much strained as to possess a certain small tension. When it is desired to stop the automobile, the handle u is moved rearward, so as to press the curved arm t against the rim q and thereby to shift the gear wheel c rearward against the pressure of its helical spring d. Then the gear wheel c will mesh with the pinion e and will be thereby turned in the direction of the arrow while being braked, so that the rim q slides on the curved arm t and the lug r leaves behind the stop v until it strikes this stop from the other side (Fig. 3), when the curved arm t will face the recess s in the rim and the spring d will press the gear wheel c forward, so that the arm t engages in the recess s and locks the gear wheel, as is shown at Fig. 4. About this time the automobile will stop, or if not, some ordinary brake may be used for stopping it. Of course the gear wheel c will have completed nearly one revolution and will have turned the long pinion f in the same direction as the shaft a. According to the ratio of the gear wheel c and the pinion f the latter will have made several revolutions and wound up the long helical spring i, which then attains its maximum tension. Then the said clutch is engaged for connecting the pinion f with the motor shaft p.

When it is desired to start the automobile, the handle u is moved forward, so as to withdraw the curved arm t from the recess s in the rim q. Thereby the gear wheel c and consequently also the long pinion f will be released, so that the strained spring i will turn the gear wheel c back to the initial position, in which the stop v strikes the lug r and stops the gear wheel c. Meanwhile the pinion f will have transmitted its rotation by means of the shaft g, the gear wheels l l¹ the shaft k, the chain wheels m and o and the endless chain n to the motor shaft p, which therefore makes a few revolutions, before the motor M commences to properly work. At the proper moment the clutch is operated for disconnecting the motor shaft p from the pinion f.

The spring device can be varied without departing from the spirit of our invention.

We claim:

1. In an automobile, the combination with a shaft adapted to drive the rear wheel axle, of a pinion fastened on said shaft, a pin in the frame parallel to said shaft, a gear wheel movable on said pin and adapted to mesh with said pinion in one position, a spring adapted to shift said gear wheel out of engagement with said pinion, a second shaft parallel to said shaft, a long pinion fastened on said second shaft and adapted to permanently mesh with said gear wheel, a helical spring surrounding said second shaft and connected at one end with the frame and at the other end with said long pinion, means for transmitting the motion from said long pinion to the motor shaft, means for pushing at will said gear wheel against the pressure of said first named spring into engagement with said pinion, and means for locking and releasing said gear wheel.

2. In an automobile, the combination with a shaft adapted to drive the rear wheel axle, of a pinion fastened on said shaft, a pin in the frame parallel to said shaft, a gear wheel movable on said pin and adapted to mesh with said pinion in one position, a spring adapted to shift said gear wheel out of engagement with said pinion, a second shaft parallel to said shaft, a long pinion fastened on said second shaft and adapted to permanently mesh with said gear wheel, a helical spring surrounding said second shaft and connected at one end with the frame and at the other end with said long pinion, means for transmitting the motion from said long pinion to the motor shaft, means for pushing at will said gear wheel against the pressure of said first named spring into engagement with said pinion, means for limiting the turn of said gear wheel while permitting it to return to its initial position at the end of the turn, and means for releasing said gear wheel and thereby said helical spring.

3. The combination with a frame, of a shaft in said frame adapted to be driven, a pinion fastened on said shaft, a pin in said frame parallel to said shaft, a gear wheel movable on said pin and adapted to mesh with said pinion in one position, a spring adapted to shift said gear wheel out of engagement with said pinion, a second shaft in said frame parallel to said shaft, a long pinion fastened on said second shaft and adapted to permanently mesh with said gear wheel, a helical spring surrounding said second shaft and connected at one end with said frame and at the other end with said long pinion, a shaft, means for transmitting the motion from said long pinion to said shaft, a rim on one side of said gear wheel and having a recess and a lug close thereto, a cross shaft in said frame at right angles to said shaft, an arm on said shaft adapted to press against said rim and thereby to shift said gear wheel into engagement with said pinion, a stop on said frame adapted to strike the lug of said rim for limiting the turn of said gear wheel, said arm being adapted to engage in the recess of said rim at the end of the turn in one direction for permitting said gear wheel to move under the action of said spring and out of engagement with said pinion, and means for rocking said cross shaft.

4. An explosive engine starter for automobiles comprising in combination, an explosive engine, a spring starting mechanism therefor provided with a gear, a second gear in driving connection with said first named gear and adapted to be shifted into driven relation with the engine, a spring normally acting to shift said second gear out of driven relation with the engine, and a lever for shifting said second gear into driven relation with said engine to tension the spring of said mechanism, said second gear having a notch adapted to register with said lever thereby permitting the spring of said second gear to shift the same out of driven relation with the engine and into locking relation with said lever, substantially as and for the purposes set forth.

5. An explosive engine starter for automobiles comprising in combination, an explosive engine, spring starting mechanism therefor, an element in driving connection with said mechanism and adapted to be shifted into driven relation with said engine, a locking member for shifting said element into driven relation with the engine to tension said spring, and means for shifting said element out of driven relation with said engine and into locking engagement with said locking member, substantially as described.

6. An explosive engine starter for automobiles comprising in combination, an explosive engine, a spring starting mechanism therefor, a rotary element in driving connection with said mechanism and adapted to be shifted into driven relation with said engine, a locking member for shifting said rotary element into driven relation with the engine to tension said spring, and means for shifting said rotary element out of driven relation with said engine and into locking engagement with said locking member, substantially as described.

7. An explosive engine starter for automobiles comprising in combination, an explosive engine, spring starting mechanism therefor, a rotary element in driving connection with said mechanism and adapted to be shifted into driven relation with said engine, a pivotally mounted spring locking member for shifting said rotary element into driven relation with the engine to tension said spring, and a spring normally acting to shift said rotary element out of driven relation with said engine and into locking engagement with said locking member, substantially as described.

8. An explosive engine starter for automobiles comprising in combination, an explosive engine, a spring starting mechanism therefor, a rotary element in driving relation with said mechanism and having a locking portion, a locking member for shifting said element into driven relation with the engine to tension said spring, and means for shifting said rotary element out of driven relation with said engine upon engagement of said locking portion with said locking member, substantially as described.

9. An explosive engine starter for automobiles comprising in combination, an automobile engine, a spring starting mechanism therefor, a rotary element in driving relation with said mechanism and adapted to be shifted into driven relation with said engine, means adjacent said rotary element to prevent tension reduction of said spring to a minimum, a locking member for shifting said rotary element into driven relation with said engine to tension said spring, and means for shifting said rotary element out of driven relation with said engine and into locking engagement with said member, substantially as described.

10. An explosive engine starter for automobiles comprising in combination, an explosive engine, spring starting mechanism therefor, a rotary element in driving relation with said mechanism and adapted to be shifted into driven relation with said engine, a lug engaging said rotary element to prevent tension reduction of said spring to a minimum, a lever for shifting said element into driven relation with said engine to tension said spring, and means for shifting said element out of driven relation with said engine, substantially as described.

ALEXANDER MARKMANN. [L. S.]
WILLY STAUTER. [L. S.]

Witnesses:
HELEN NUFER,
ALBERT NUFER.